(12) United States Patent
Tan et al.

(10) Patent No.: US 12,163,203 B2
(45) Date of Patent: Dec. 10, 2024

(54) HIGH-PERFORMANCE THERMOFORMED COMPONENT PROVIDED WITH COATING, AND MANUFACTURING METHOD THEREFOR

(71) Applicant: BAOSHAN IRON & STEEL CO., LTD., Shanghai (CN)

(72) Inventors: Ning Tan, Shanghai (CN); Junxiang Liu, Shanghai (CN); Caigen Huang, Shanghai (CN); Lei Jiang, Shanghai (CN); Chao Wang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 373 days.

(21) Appl. No.: 17/780,620

(22) PCT Filed: Nov. 27, 2020

(86) PCT No.: PCT/CN2020/132307
§ 371 (c)(1),
(2) Date: May 27, 2022

(87) PCT Pub. No.: WO2021/104462
PCT Pub. Date: Jun. 3, 2021

(65) Prior Publication Data
US 2023/0002850 A1    Jan. 5, 2023

(30) Foreign Application Priority Data

Nov. 29, 2019    (CN) .......................... 201911201470.3

(51) Int. Cl.
*C21D 9/52*        (2006.01)
*B21D 22/02*    (2006.01)
(Continued)

(52) U.S. Cl.
CPC ............. *C21D 9/52* (2013.01); *B21D 22/022* (2013.01); *B32B 15/012* (2013.01); *C21D 6/002* (2013.01);
(Continued)

(58) Field of Classification Search
None
See application file for complete search history.

(56) References Cited

U.S. PATENT DOCUMENTS

2023/0002843 A1*    1/2023    Tan ...................... C22C 21/10

FOREIGN PATENT DOCUMENTS

CN         1676318 A      10/2005
CN       102300707 A      12/2011
(Continued)

OTHER PUBLICATIONS

The extended European search report for App No. 20891774.0-1103 PCT/CN2020/132307 dated Aug. 1, 2022.
(Continued)

*Primary Examiner* — Daniel J. Schleis
(74) *Attorney, Agent, or Firm* — Lei Fang, Esq.; Smith Tempel Blaha LLC (57) ABSTRACT

A high-performance thermoformed component provided with a coating, and a manufacturing method therefor. The thermoformed component comprises a substrate and a coating thereon. The substrate comprises the following ingredients in percentage by weight: 0.01-0.8% of C, 0.05-1.0% of Si, 0.1-5% of Mn, 0.001-0.3% of P, 0.001-0.1% of S, 0.001-0.3% of Al, 0.001-0.5% of Ti, 0.0005-0.1% of B, 0.001-0.5% of Nb, 0.001-0.5% of V, and the remainder being Fe and other unavoidable impurities. The appearance of the thermoformed component has no color difference and no mottling. The surface oxygen content of the thermoformed component is 0.1-20 wt. %, and the ratio of the
(Continued)

standard deviation to the average value of the surface oxygen content satisfies: 0<standard deviation of oxygen content/average value of oxygen content ≤0.3. In the manufacturing method, a coated steel plate that has undergone heat treatment, transfer processing, and hot stamping is not treated with oil.

20 Claims, 2 Drawing Sheets

(51) Int. Cl.
| | |
|---|---|
| B32B 15/01 | (2006.01) |
| C21D 6/00 | (2006.01) |
| C21D 8/02 | (2006.01) |
| C22C 21/02 | (2006.01) |
| C22C 38/00 | (2006.01) |
| C22C 38/02 | (2006.01) |
| C22C 38/06 | (2006.01) |
| C22C 38/24 | (2006.01) |
| C22C 38/26 | (2006.01) |
| C22C 38/28 | (2006.01) |
| C22C 38/32 | (2006.01) |
| C22C 38/38 | (2006.01) |
| C23C 2/12 | (2006.01) |
| C23C 2/26 | (2006.01) |
| C23C 2/28 | (2006.01) |
| C23C 2/40 | (2006.01) |

(52) U.S. Cl.
CPC ............. *C21D 6/005* (2013.01); *C21D 6/008* (2013.01); *C21D 8/0205* (2013.01); *C22C 21/02* (2013.01); *C22C 38/002* (2013.01); *C22C 38/02* (2013.01); *C22C 38/06* (2013.01); *C22C 38/24* (2013.01); *C22C 38/26* (2013.01); *C22C 38/28* (2013.01); *C22C 38/32* (2013.01); *C22C 38/38* (2013.01); *C23C 2/12* (2013.01); *C23C 2/26* (2013.01); *C23C 2/28* (2013.01); *C23C 2/29* (2022.08); *C23C 2/40* (2013.01)

(56) References Cited

FOREIGN PATENT DOCUMENTS

| | | |
|---|---|---|
| CN | 106466697 A | 3/2017 |
| CN | 108774709 A | 11/2018 |
| CN | 109518114 A | 3/2019 |
| CN | 10971918 A | 5/2019 |
| KR | 20130002214 A | 1/2013 |

OTHER PUBLICATIONS

International Search Report for PCT/CN2020/132307 dated Feb. 8, 2021.
International Written Opinion for PCT/CN2020/132307 dated Feb. 8, 2021.

* cited by examiner

HIGH-PERFORMANCE THERMOFORMED COMPONENT PROVIDED WITH COATING, AND MANUFACTURING METHOD THEREFOR

CROSS-REFERENCE TO RELATED APPLICATIONS

This application is a 371 U.S. National Phase of PCT International Application No. PCT/CN2020/132307 filed on Nov. 27, 2020, which claims benefit and priority to Chinese patent application No. CN 201911201470.3 filed on Nov. 29, 2019, the contents of each of the above listed applications are incorporated by reference herein in their entireties.

TECHNICAL FIELD

The present disclosure relates to a thermoformed component and a method for manufacturing the same, in particular to a coated thermoformed component having excellent performances and a method for manufacturing the same.

BACKGROUND ART

In recent years, the application of thermoformed components in the automotive industry has become very important, especially in safety structural components of automobiles. They have irreplaceable advantages in some parts having high strength and complex shapes. The materials used for thermoformed components are classified into plated materials and unplated materials. Plated materials include hot dip galvanized materials, hot dip galvanized alloyed materials, hot dip aluminized materials, materials with inorganic/organic coating layers, etc. A plating layer is mainly aimed to protect steel plates from oxidation and decarburization of the surfaces of the steel plates during a hot stamping forming process. The formed components may be coated and welded directly for use. Unplated materials must be subjected to surface shot blasting after thermoforming, so as to remove the oxide layer generated on the surface; otherwise, subsequent coating and welding of the parts will be affected. The plated thermoforming materials widely used nowadays are mainly aluminum-silicon plated materials, because an aluminum-silicon plating layer exhibits excellent heat resistance, weather resistance and high heat reflectivity. However, conventional aluminum-silicon plated thermoforming materials often have a mottled appearance in use, looking locally inconsistent in surface color.

Chinese Patent Publication No. CN104651590A discloses an aluminum or aluminum alloy coated thermoforming material and a method for manufacturing the same. The method purposefully controls the coating layer thickness and the five-layer structure, thereby guaranteeing the welding performance of the thermoformed member.

Chinese Patent Publication No. CN108588612A discloses an aluminum or aluminum alloy coated thermoformed member. According to this patent application, the coating layer thickness is reduced. The disadvantage is that the protecting effect of the coating layer is degraded. The surface properties of the member are quite susceptible to the fluctuation of the hot forming process, and the performances of the member in subsequent use will be affected in turn.

Chinese Patent Publication No. CN101583486 discloses a hot stamped product made from a coated steel strip and a method for manufacturing the same. The method includes heating, transferring and cooling. However, the hot stamping process is not illustrated, including stamping parameters such as mold clamping speed, pressure holding time, etc. As such, the quality of the stamped product will be unstable. For example, shrinking, cracking and the like will occur. The furnace atmosphere is not controlled during the heating process, such that the atmosphere in the furnace varies during the heating process, especially the oxygen content which changes greatly. As a result, the appearance and color of the product change easily. In real production, it is found that the appearance and color of the stamped products produced from the same starting material using the same process are quite different.

Chinese Patent Publication No. CN100370054 discloses a high-strength steel sheet plated with aluminum or aluminum alloy. The highlight is how to control the contents of Cr and Mn in the plating layer to be greater than 0.1% and their influence on the corrosion resistance and heat resistance of the product. This document is silent on a hot stamping process.

SUMMARY

In view of the deficiencies of the existing coated thermoformed components and the methods for manufacturing the same, an object of the present disclosure is to provide a coated thermoformed component having excellent performances and a method for manufacturing the same. The high-strength thermoformed component has good coatability; a uniform coating film thickness, wherein the ratio of the standard deviation of the coating film thickness to the average coating film thickness satisfies: 0<standard deviation of coating film thickness/average coating film thickness ≤0.1; excellent coating film adhesion, wherein the coating film adhesion is rated as 0 or 1; and good weldability.

To achieve the above object, the technical solution of the present disclosure is as follows:

A coated thermoformed component having excellent performances, comprising a substrate and a coating layer thereon, wherein the substrate comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, optionally Cr: 0.15-0.75%, optionally Nb: 0.001-0.5%, optionally V: 0.001-0.5%, and a balance of Fe and unavoidable impurities; wherein the thermoformed component has an appearance with no color difference and no mottle; wherein the thermoformed component has an oxygen content of 0.1-20 wt. % in its surface, wherein a ratio of a standard deviation to an average oxygen content in the surface satisfies: 0<standard deviation of oxygen content/average oxygen content ≤0.3.

A coated thermoformed component having excellent performances, comprising a substrate and a coating layer thereon, wherein the substrate comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, Nb: 0.001-0.5%, V: 0.001-0.5%, and a balance of Fe and unavoidable impurities; wherein the thermoformed component has an appearance with no color difference and no mottle; wherein the thermoformed component has an oxygen content of 0.1-20 wt. % in its surface, wherein a ratio of a standard deviation to an average oxygen content in the surface satisfies: 0<standard deviation of oxygen content/average oxygen content ≤0.3.

A coated thermoformed component having excellent performances, comprising a substrate and a coating layer thereon, wherein the substrate comprises a composition by weight percentage of: C: 0.01-0.8%, Si: 0.05-1.0%, Mn:

0.1-5%, P: 0.001-0.3%, S: 0.001-0.1%, Al: 0.001-0.3%, Ti: 0.001-0.5%, B: 0.0005-0.1%, Cr: 0.15-0.75%, optionally Nb: 0.001-0.5%, optionally V: 0.001-0.5%, and a balance of Fe and unavoidable impurities; wherein the thermoformed component has an appearance with no color difference and no mottle; wherein the thermoformed component has an oxygen content of 0.1-20 wt. % in its surface, wherein a ratio of a standard deviation to an average oxygen content in the surface satisfies: 0<standard deviation of oxygen content/ average oxygen content ≤0.3.

In some embodiments, preferably, P has a content of 0.01-0.10%.

In some embodiments, preferably, S has a content of 0.001-0.05%.

In some embodiments, preferably, Nb has a content of 0.001-0.40%.

In some embodiments, preferably, V has a content of 0.001-0.40%.

In some embodiments, preferably, Nb+V has a combined content of ≤0.40%.

In some embodiments, preferably, the composition of the substrate comprises at least one, any two, or all three of Cr, Nb, and V.

Preferably, the thermoformed component has a yield strength of 400-1600 MPa, a tensile strength of 500-2300 MPa, and an elongation of ≥4%.

A method for manufacturing the coated thermoformed component having excellent performances according to the present disclosure, characterized in that the method comprises steps as follows:

1) Al—Si plating: placing a steel strip in a plating bath for Al—Si plating to obtain a plated steel sheet, wherein the plated steel sheet has a surface C, H or O content of ≤50 mg/m$^2$, a plating layer weight of 30-120 g/m$^2$ on one side, and a ratio of a standard deviation of the plating layer weight to an average plating layer weight satisfies: 0<standard deviation of plating layer weight/ average plating layer weight ≤0.3;

2) Blanking: processing the plated steel sheet, directly or after cold-rolling, into a blank in a shape required by a component by punching or laser cutting;

3) Heat treating the blank: placing the blank into a heating furnace for heating and soaking, wherein the heating furnace has a temperature of 680-970° C.; the atmosphere in the heating furnace is natural air, with no additional gas supplied; a dew point in the furnace is lower than 5° C.; and a total residence time of the blank in the heating furnace is 1-13 minutes;

4) Blank transfer: transferring the heated blank into a mold quickly for stamping, wherein a transfer time is less than 10 seconds;

5) Hot stamping the blank: cooling and stamping the heated blank.

Preferably, the total residence time in step 3) is 1.5-13 minutes or 1-10 minutes or 1.5-11 minutes.

Preferably, in step 3), the heating furnace includes two temperature zones comprising a low temperature zone of 680-870° C. and a high temperature zone of 880-970° C., wherein a residence time of the blank in the low temperature zone is 0.5-3 minutes, and a residence time in the high temperature zone is 1-10 minutes.

Preferably, in step 5), the hot stamping of the blank starts at a temperature of not lower than 600° C. In some embodiments, the hot stamping of the blank starts at a temperature in the range of 630-800° C.

Preferably, in the stamping process of step 5), quenching while holding pressure is continued for 4-20 s after the mold is clamped, wherein an average pressure applied to the component for pressure holding needs to be greater than 8 MPa on the surface of the component. In some embodiments, the holding pressure is in the range of 8-20 MPa. In some embodiments, a speed for clamping upper and lower parts of the mold is 50-100 mm/s.

Preferably, in step 5), the heated blank is cooled between 800° C. and 400° C. at a cooling rate of greater than 30° C./s, preferably, greater than 60° C./s. In some embodiments, the cooling rate is 60-100° C./s.

Preferably, after the stamping, the thermoformed component is removed from the mold after the mold has a surface temperature of lower than 150° C.

The plating layer on the surface of the plated steel sheet is mainly aluminum. During the heating process, aluminum diffuses into the substrate while it is being heated to form an iron-aluminum alloy. The iron-aluminum alloy is rigid and brittle, and has a high melting point.

The surface of the thermoformed part is referred to as a coating layer herein. The melting point of aluminum in the plating layer on the surface of the primary steel sheet is very low, namely about 600° C. In the early stage of heating, if the heating rate is too fast, aluminum in the plating layer will melt first and adhere to heating rolls, thereby damaging the plating layer and affecting protection of the plating layer. Further, the coatability, corrosion resistance, and weldability of the thermoformed components will be affected. The heating furnace of the present disclosure is provided with two zones. The main purpose of the low temperature zone is to allow the plating layer to diffuse fully and avoid melting at the early stage of heating, and the main purpose of the high temperature zone is to guarantee the high strength of the thermoformed component.

During the hot stamping process of the plated steel sheet, the plating layer diffuses gradually during the heating process to form an iron-aluminum alloy layer having a multi-layer structure. At the same time, there is an oxide layer having a porous structure on the surface. Both the alloy layer structure in the coating layer of the thermoformed component and the surface oxide structure have an influence on the product appearance. Local inconsistency often leads to color difference and mottle in the product appearance, affecting the usability of the product.

The inventors of the present disclosure have discovered by research that the C, H or O content and distribution in the surface of the blank product, the uniformity of the plating layer thickness, and the hot stamping process all have significant influences on the appearance of the thermoformed component. If the plating layer thickness is not uniform, the diffusion traces of the elements are different within the same heat treatment time, resulting in different degrees of diffusion and an appearance showing color difference. If the C, H or O content is not uniform, the volatilization and decomposition rates are different during the heating process of the blank in the furnace, resulting in uneven heating of the surface of the blank, such that the diffusion rates and degrees of the surface elements of the blank are different, resulting in uneven color in the appearance of the thermoformed component.

The inventors of the present disclosure have also discovered that the C, H or O in the surface of the blank product mainly comes from oil. Traditionally, a plated steel sheet is not subjected to a degreasing process before hot stamping; instead, it is fed into a heat treatment furnace directly. During the heating process, the oil will be further volatilized or decomposed, thereby influencing the atmosphere at the blank surface. At the same time, residual ash will be produced inevitably after the oil is decomposed, which will affect the final surface elemental composition of the component. In turn, the appearance and coatability of the product will be affected. Therefore, it's preferable that no oil is applied to the plated sheet of the present disclosure.

Since it's preferable that no oil is applied to the plated sheet of the present disclosure, no additional water vapor is generated during the heating process, and the dew point will not rise. Thus, it has a very positive effect on the control of the dew point in the furnace, and has a positive effect on the delayed cracking performance of the product. The reason is that water vapor generated by decomposition of oil under heating will inevitably cause the dew point in the furnace to rise, and the risen dew point will evoke hydrogen-induced delayed cracking, resulting in hydrogen embrittlement.

No oil is applied to the plated steel sheet of the present disclosure. So, there is almost no damage to the heat treatment furnace during the hot stamping process. Because trace acid gases will be generated additionally when oil is heated and decomposed, and will inevitably cause certain damage to the heat treatment furnace, the atmosphere in the hearth needs special management for certain heat treatment furnaces; otherwise, the life of the heat treatment furnace and the product quality are prone to being affected. The step for applying oil can be omitted in the method for manufacturing the thermoformed component according to the present disclosure, and thus the cost can be reduced.

The weight of the plating layer is uniform across the surface of the plated steel sheet of the present disclosure. The distance and time of diffusion of the plating layer are relatively uniform during the hot stamping process, and the elemental composition in the surface of the thermoformed component is relatively stable.

According to the hot stamping method of the present disclosure, the heat treatment process takes place in a low temperature zone and a high temperature zone, wherein the low temperature zone can allow the plating layer to diffuse sufficiently slowly to prevent the plating layer from melting, and guarantee the integrity of the plating layer and the uniformity of the surface.

DETAILED DESCRIPTION

The present disclosure will be further illustrated with reference to the Examples and accompanying drawings.

The compositions of the steel sheets used in the Examples according to the disclosure and the Comparative Examples are listed in Table 1. Table 2 shows the manufacturing processes for the Examples according to the disclosure and the Comparative Examples. Table 3 shows the properties of the Examples according to the disclosure and the Comparative Examples. The weight of the plating layer for each Example and Comparative Example was controlled at 30-120 g/m² on one side. In each Example and Comparative Example, the atmosphere in the heating furnace was natural air with no additional gas supplied into the heating furnace, and the dew point in the furnace was lower than 5° C.

Example 1

A 1.2 mm plated steel sheet was laser blanked into a blank of a certain size and shape. The composition of the hot dip plating bath was Si: 0.5%, Fe: 0.5%, and the rest was aluminum and unavoidable impurities. The blank was fed into a heating furnace. The temperature of the heating furnace was 680-950° C., and the residence time was 3.0 min. The heated blank was transferred into a mold within 5 s. The speed for clamping the mold was 70 mm/s. Stamping started at a temperature of 680° C. The holding time was 10 s, and the holding pressure was 14 MPa.

Example 2

A 0.9 mm plated steel sheet was laser blanked into a blank of a certain size and shape. The composition of the hot dip plating bath was Si: 4%, Fe: 4%, and the rest was aluminum and unavoidable impurities. The blank was fed into a heating furnace. The temperature of the heating furnace was 700-940° C., and the residence time was 5 min. Stamping started at a temperature of 700° C. The heated blank was transferred into a mold within 7 s. The speed for clamping the mold was 80 mm/s. The holding time was 13 s, and the holding pressure was 15 MPa.

Example 3

A 1.0 mm plated steel sheet was laser blanked into a blank of a certain size and shape. The composition of the hot dip plating bath was Si: 9.0%, Fe: 2.7%, and the rest was aluminum and unavoidable impurities. The blank was fed into a heating furnace. The temperature of the heating furnace was 850-880° C., and the residence time was 11 min. Stamping started at a temperature of 650° C. The heated blank was transferred into a mold within 8 s. The speed for clamping the mold was 70 mm/s. The holding time was 6 s, and the holding pressure was 12 MPa.

Example 4

A 2.8 mm plated steel sheet was cold rolled to 2.0 mm, and laser blanked into a blank of a certain size and shape. The composition of the hot dip plating bath was Si: 8.8%, Fe: 2.7%, and the rest was aluminum and unavoidable impurities. The blank was fed into a heating furnace. The temperature of the heating furnace was 800-920° C., and the residence time was 7 min. Stamping started at a temperature of 630° C. The heated blank was transferred into a mold within 8 s. The speed for clamping the mold was 70 mm/s. The holding time was 8 s, and the holding pressure was 14 MPa.

Example 5

A 1.1 mm plated steel sheet was laser blanked into a blank of a certain size and shape. The composition of the hot dip plating bath was Si: 14%, Fe: 3.5%, and the rest was aluminum and unavoidable impurities. The blank was fed into a heating furnace. The temperature of the heating furnace was 810-935° C., and the residence time was 5.5 min Stamping started at a temperature of 780° C. The heated blank was transferred into a mold within 7 s. The speed for clamping the upper and lower parts of the mold was 80 mm/s. The holding time was 10 s, and the holding pressure was 15 MPa.

Example 6

A 1.5 mm plated steel sheet was laser blanked into a blank of a certain size and shape. The composition of the hot dip plating bath was Si: 10%, Fe: 3.5%, and the rest was aluminum and unavoidable impurities. The blank was fed into a heating furnace. The temperature of the heating furnace was 870-960° C., and the residence time was 4 min. Stamping started at a temperature of 750° C. The heated blank was transferred into a mold within 7 s. The speed for clamping the upper and lower parts of the mold was 80 mm/s. The holding time was 15 s, and the holding pressure was 17 MPa.

Example 7

A 1.8 mm plated steel sheet was laser blanked into a blank of a certain size and shape. The composition of the hot dip plating bath was Si: 10%, Fe: 3.5%, and the rest was aluminum and unavoidable impurities. The blank was fed into a heating furnace. The temperature of the heating furnace was 800-945° C., and the residence time was 3.5 min. The heated blank was transferred into a mold within 7 s. The speed for clamping the upper and lower parts of the mold was 80 mm/s. The holding time was 20 s, and the holding pressure was 18 MPa.

Example 8

A 2.0 mm plated steel sheet was laser blanked into a blank of a certain size and shape. The composition of the hot dip plating bath was Si: 10%, Fe: 3.5%, and the rest was aluminum and unavoidable impurities. The blank was fed into a heating furnace. The temperature of the heating furnace was 850-935° C., and the residence time was 4 min. Stamping started at a temperature of 720° C. The heated blank was transferred into a mold within 7 s. The speed for clamping the upper and lower parts of the mold was 80 mm/s. The holding time was 18 s, and the holding pressure was 20 MPa.

Example 9

A 2.4 mm plated steel sheet was cold rolled at a cold rolling reduction of 10%, and laser blanked into a blank of a certain size and shape. The composition of the hot dip plating bath was Si: 10%, Fe: 3.5%, and the rest was aluminum and unavoidable impurities. The blank was fed into a heating furnace. The temperature of the heating furnace was 870-935° C., and the residence time was 5 min Stamping started at a temperature of 730° C. The heated blank was transferred into a mold within 7 s. The speed for clamping the upper and lower parts of the mold was 80 mm/s. The holding time was 12 s, and the holding pressure was 13 MPa.

Example 10

A 2.8 mm plated steel sheet was cold rolled at a cold rolling reduction of 50%, and laser blanked into a blank of a certain size and shape. The composition of the hot dip plating bath was Si: 10%, Fe: 3.5%, and the rest was aluminum and unavoidable impurities. The blank was fed into a heating furnace. The temperature of the heating furnace was 800-970° C., and the residence time was 3.5 min Stamping started at a temperature of 760° C. The heated blank was transferred into a mold within 7 s. The speed for clamping the upper and lower parts of the mold was 80 mm/s. The holding time was 13 s, and the holding pressure was 16 MPa.

Example 11

A 2.0 mm plated steel sheet was laser blanked into a blank of a certain size and shape. The composition of the hot dip plating bath was Si: 8.5%, Fe: 2.8%, and the rest was aluminum and unavoidable impurities. The blank was fed into a heating furnace. The temperature of the heating furnace was 840-920° C., and the residence time was 4.5 min Stamping started at a temperature of 690° C. The heated blank was transferred into a mold within 6 s. The speed for clamping the upper and lower parts of the mold was 70 mm/s. The holding time was 15 s, and the holding pressure was 13 MPa.

Example 12

A 2.5 mm plated steel sheet was laser blanked into a blank of a certain size and shape. The composition of the hot dip plating bath was Si: 4.0%, Fe: 2.7%, and the rest was aluminum and unavoidable impurities. The blank was fed into a heating furnace. The temperature of the heating furnace was 700-900° C., and the residence time was 5 min. Stamping started at a temperature of 800° C. The heated blank was transferred into a mold within 7 s. The speed for clamping the upper and lower parts of the mold was 80 mm/s. The holding time was 10 s, and the holding pressure was 15 MPa.

Example 13

A 1.0 mm plated steel sheet was laser blanked into a blank of a certain size and shape. The composition of the hot dip plating bath was Si: 10%, Fe: 3%, and the rest was aluminum and unavoidable impurities. The blank was fed into a heating furnace. The temperature of the heating furnace was 850-930° C., and the residence time was 8 min. Stamping started at a temperature of 730° C. The heated blank was transferred into a mold within 6 s. The speed for clamping the upper and lower parts of the mold was 70 mm/s. The holding time was 13 s, and the holding pressure was 9 MPa.

Example 14

A 3.0 mm plated steel sheet was cold rolled at a cold rolling reduction of 40%, and laser blanked into a blank of a certain size and shape. The composition of the hot dip plating bath was Si: 11%, Fe: 2.5%, and the rest was aluminum and unavoidable impurities. The blank was fed into a heating furnace. The temperature of the heating furnace was 830-910° C., and the residence time was 4 min Stamping started at a temperature of 760° C. The heated blank was transferred into a mold within 7 s. The speed for clamping the upper and lower parts of the mold was 80 mm/s. The holding time was 13 s, and the holding pressure was 16 MPa.

Example 15

A 1.8 mm plated steel sheet was laser blanked into a blank of a certain size and shape. The composition of the hot dip plating bath was Si: 9.5%, Fe: 2.6%, and the rest was aluminum and unavoidable impurities. The blank was fed into a heating furnace. The temperature of the heating furnace was 830-920° C., and the residence time was 6 min. Stamping started at a temperature of 710° C. The heated blank was transferred into a mold within 6 s. The speed for clamping the upper and lower parts of the mold was 80 mm/s. The holding time was 10 s, and the holding pressure was 10 MPa.

Example 16

A 1.5 mm plated steel sheet was laser blanked into a blank of a certain size and shape. The composition of the hot dip plating bath was Si: 11%, Fe: 2.8%, and the rest was aluminum and unavoidable impurities. The blank was fed into a heating furnace. The temperature of the heating furnace was 850-920° C., and the residence time was 7 min. Stamping started at a temperature of 740° C. The heated blank was transferred into a mold within 7 s. The speed for clamping the upper and lower parts of the mold was 70 mm/s. The holding time was 9 s, and the holding pressure was 13 MPa.

Comparative Example 1

A 1.5 mm plated steel sheet (with oil applied to its surface in an amount of 700 mg/m$^2$) was laser blanked into a blank of a certain size and shape. The composition of the hot dip plating bath was Si: 10%, Fe: 2.8%, and the rest was aluminum and unavoidable impurities. The blank was fed into a heating furnace. The temperature of the heating furnace was 935° C., and the residence time was 4.5 min Stamping started at a temperature of 700° C. The heated blank was transferred into a mold within 7 s. The speed for clamping the upper and lower parts of the mold was 70 mm/s. The holding time was 10 s, and the holding pressure was 12 MPa.

Comparative Example 2

A 1.5 mm plated steel sheet (with oil applied to its surface in an amount of 1000 mg/m$^2$) was laser blanked into a blank of a certain size and shape. The composition of the hot dip plating bath was Si: 8%, Fe: 2.6%, and the rest was aluminum and unavoidable impurities. The blank was fed into a heating furnace. The temperature of the heating furnace was 935° C., and the residence time was 4.5 min Stamping started at a temperature of 750° C. The heated blank was transferred into a mold within 6 s. The speed for clamping the upper and lower parts of the mold was 70 mm/s. The holding time was 15 s, and the holding pressure was 10 MPa.

Figure 1:
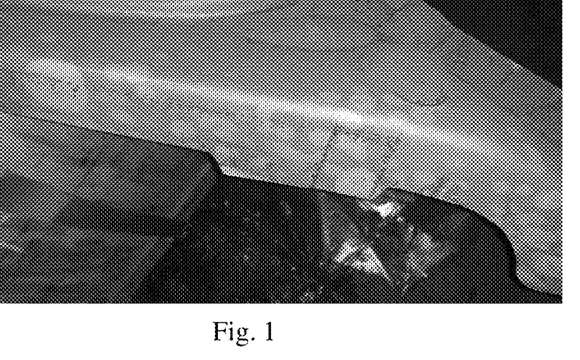
FIG. 1 is a photograph showing the appearance of the coated thermoformed component of Comparative Example 1.
Figure 2:
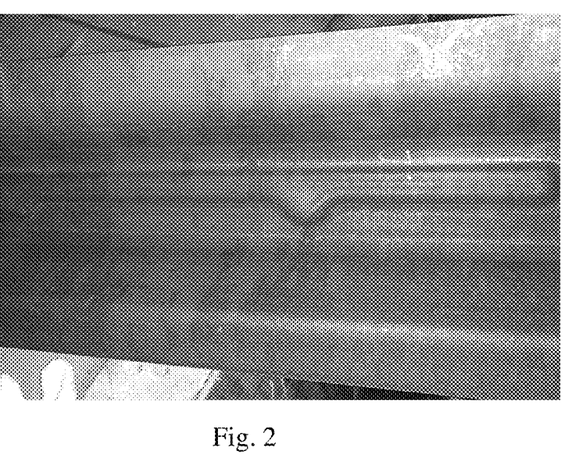
FIG. 2 is a photograph showing the appearance of the coated thermoformed component of Comparative Example 2.
Figure 3:
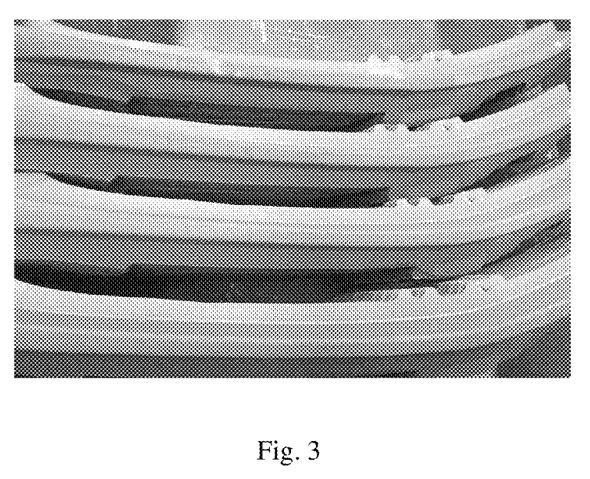
FIG. 3 is a photograph showing the appearance of the coated thermoformed component of Example 1 according to the present disclosure.

As it can be seen from FIG. 1 and FIG. 2 for the Comparative Examples, because oil was applied to the surfaces of the plated sheets, and the distribution of the oil on the surfaces was uneven, mottle or local color difference was observed in the appearance of the thermoformed products. FIG. 3 shows the appearance of the unoiled products in the Examples according to the present disclosure, wherein there was no color difference or mottle in the appearance.

The results show that the coated thermoformed components of Examples 1-14 had good coatability, and a coating film having a uniform thickness was formed after coating. The ratio of the standard deviation of the coating film thickness to the average coating film thickness satisfied: 0<standard deviation of coating film thickness/average coating film thickness ≤0.1. The coating film adhesion (measured according to Coating Film Adhesion Test Method GBT 9286-1998) was rated as 1 or 0. These coated thermoformed components also had good weldability. In contrast, in the Comparative Examples, after oil was applied to the surfaces of the plated sheets, the oil was not distributed evenly on the surfaces, so mottle or local color difference was observed in the appearance of the thermoformed products, the thickness of the coating film was not uniform, and the adhesion of the coating film was poor.

TABLE 1

| Ex. | C | Si | Mn | P | S | Al | Ti | B | Cr | Nb | V |
|---|---|---|---|---|---|---|---|---|---|---|---|
| 1 | 0.02 | 0.05 | 0.90 | 0.059 | 0.038 | 0.09 | 0.090 | 0.0005 | 0.15 | — | — |
| 2 | 0.06 | 0.23 | 1.19 | 0.002 | 0.001 | 0.04 | 0.003 | 0.004 | 0.27 | — | — |
| 3 | 0.19 | 0.50 | 2.51 | 0.024 | 0.040 | 0.08 | 0.027 | 0.005 | 0.51 | 0.002 | 0.002 |
| 4 | 0.21 | 0.36 | 3.00 | 0.044 | 0.030 | 0.07 | 0.050 | 0.006 | 0.71 | 0.003 | 0.35 |
| 5 | 0.23 | 0.48 | 0.50 | 0.081 | 0.020 | 0.05 | 0.40 | 0.007 | 0.20 | — | — |
| 6 | 0.15 | 0.10 | 2.90 | 0.059 | 0.038 | 0.15 | 0.090 | 0.003 | 0.15 | — | — |
| 7 | 0.25 | 0.23 | 1.19 | 0.015 | 0.001 | 0.04 | 0.030 | 0.004 | 0.27 | — | — |
| 8 | 0.40 | 0.50 | 2.51 | 0.024 | 0.040 | 0.28 | 0.027 | 0.005 | 0.51 | 0.35 | 0.008 |
| 9 | 0.30 | 0.36 | 4.80 | 0.044 | 0.030 | 0.07 | 0.050 | 0.006 | 0.71 | — | — |
| 10 | 0.70 | 0.90 | 0.50 | 0.081 | 0.020 | 0.05 | 0.200 | 0.091 | 0.20 | — | — |
| 11 | 0.03 | 0.05 | 0.80 | 0.050 | 0.030 | 0.15 | 0.48 | 0.095 | — | 0.10 | 0.20 |
| 12 | 0.78 | 0.95 | 0.10 | 0.10 | 0.050 | 0.005 | 0.005 | 0.001 | — | 0.002 | 0.30 |
| 13 | 0.25 | 0.33 | 4.80 | 0.048 | 0.033 | 0.06 | 0.058 | 0.006 | — | 0.32 | 0.08 |
| 14 | 0.48 | 0.55 | 2.80 | 0.034 | 0.045 | 0.28 | 0.48 | 0.005 | — | 0.38 | 0.008 |
| 15 | 0.28 | 0.30 | 4.10 | 0.043 | 0.030 | 0.05 | 0.052 | 0.006 | 0.50 | 0.32 | — |
| 16 | 0.40 | 0.45 | 2.75 | 0.020 | 0.040 | 0.09 | 0.020 | 0.03 | 0.35 | — | 0.18 |
| Comp. Ex. 1 | 0.22 | 0.23 | 1.19 | 0.015 | 0.001 | 0.04 | 0.030 | 0.004 | 0.17 | — | — |
| Comp. Ex. 2 | 0.22 | 0.20 | 1.22 | 0.015 | 0.001 | 0.04 | 0.030 | 0.004 | 0.17 | — | — |

TABLE 2

| Ex. | Steel sheet thickness, mm | C, H, O content, g/m² | Cold rolling reduction, % | Highest temperatures in low temperature zone/high temperature zone, °C. | Durations in low temperature zone/high temperature zone, min | Dew point in furnace, °C. | Stamping starting temperature, °C. | Pressure holding time, s | Holding pressure, Pa | Cooling rate between 800-400° C., °C./s |
|---|---|---|---|---|---|---|---|---|---|---|
| 1 | 1.2 | 0.1 | 0 | 680/950 | 0.5/2.5 | −10 | 680 | 4 | 9 | 65 |
| 2 | 0.9 | 1 | 0 | 700/940 | 3/2 | −10 | 700 | 5 | 10 | 70 |
| 3 | 1.0 | 5 | 0 | 850/880 | 1/10 | −15 | 650 | 6 | 12 | 80 |
| 4 | 2.8 | 10 | 28.6 | 800/920 | 2/5 | −15 | 630 | 8 | 14 | 90 |
| 5 | 1.1 | 15 | 0 | 810/935 | 1/4.5 | −6 | 780 | 10 | 15 | 100 |
| 6 | 1.5 | 20 | 0 | 870/960 | 3/1 | −10 | 750 | 15 | 17 | 68 |
| 7 | 1.8 | 25 | 0 | 800/945 | 1/2.5 | −10 | 800 | 20 | 18 | 75 |
| 8 | 2.0 | 30 | 0 | 850/940 | 1/3 | −7 | 720 | 18 | 20 | 85 |
| 9 | 2.4 | 40 | 10 | 870/935 | 1/4 | −10 | 730 | 12 | 13 | 95 |
| 10 | 2.8 | 50 | 50 | 800/970 | 1/2.5 | 4 | 760 | 13 | 16 | 69 |
| 11 | 2.0 | 0.1 | 0 | 840/920 | 1.5/3 | −10 | 690 | 15 | 13 | 65 |
| 12 | 2.5 | 50 | 0 | 700/950 | 2/3 | −6 | 800 | 10 | 15 | 95 |
| 13 | 1.0 | 30 | 0 | 850/930 | 3/5 | 4 | 730 | 13 | 9 | 70 |
| 14 | 3.0 | 10 | 40 | 830/950 | 1/3 | −11 | 760 | 13 | 16 | 83 |
| 15 | 1.8 | 20 | 0 | 830/920 | 2/4 | 0 | 710 | 10 | 10 | 75 |
| 16 | 1.5 | 15 | 0 | 850/920 | 2.5/4.5 | −3 | 740 | 9 | 13 | 70 |
| Comp. Ex. 1 | 1.5 | 1000 | 0 | 935 | 4.5 | 10 | 700 | 10 | 12 | 70 |
| Comp. Ex. 2 | 1.5 | 500 | 0 | 935 | 4.5 | 15 | 750 | 15 | 10 | 65 |

TABLE 3

| Ex. | Yield strength, MPa | Tensile strength, MPa | Elongation, % | Surface O content in thermoformed component, % | Standard deviation of oxygen content/average oxygen content |
|---|---|---|---|---|---|
| 1 | 400 | 500 | 15 | 0.5 | 0.01 |
| 2 | 500 | 650 | 14 | 1 | 0.1 |
| 3 | 980 | 1300 | 7 | 10 | 0.05 |
| 4 | 1100 | 1600 | 6 | 5 | 0.3 |
| 5 | 1000 | 1500 | 7 | 15 | 0.2 |
| 6 | 1200 | 1650 | 6 | 20 | 0.15 |
| 7 | 1300 | 1700 | 5.5 | 13 | 0.02 |
| 8 | 1400 | 1700 | 5 | 10 | 0.03 |
| 9 | 1350 | 1680 | 5.8 | 15 | 0.08 |
| 10 | 1550 | 2000 | 4.3 | 18 | 0.01 |
| 11 | 500 | 630 | 12 | 14 | 0.02 |
| 12 | 1300 | 2200 | 5 | 15 | 0.03 |
| 13 | 1100 | 1600 | 10 | 14 | 0.04 |
| 14 | 1400 | 2100 | 5 | 10 | 0.05 |
| 15 | 1200 | 1700 | 11 | 18 | 0.06 |
| 16 | 1150 | 1900 | 6 | 19 | 0.03 |
| Comp. Ex. 1 | 1050 | 1560 | 6 | 50 | 0.5 |
| Comp. Ex. 2 | 1100 | 1600 | 5.8 | 30 | 0.7 |

What is claimed is:

1. A coated thermoformed component having excellent performances, comprising a substrate and a coating layer thereon, wherein the substrate comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, optionally Cr: 0.15-0.75%, optionally Nb: 0.001-0.5%, optionally V: 0.001-0.5%, and a balance of Fe and unavoidable impurities; wherein the thermoformed component has an appearance with no color difference and no mottle; wherein the thermoformed component has an oxygen content of 0.1-20 wt. % in its surface, wherein a ratio of a standard deviation to an average oxygen content in the surface satisfies: 0<standard deviation of oxygen content/average oxygen content≤0.3.

2. The coated thermoformed component having excellent performances according to claim 1, wherein the substrate comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, Nb: 0.001-0.5%, V: 0.001-0.5%, and a balance of Fe and unavoidable impurities.

3. The coated thermoformed component having excellent performances according to claim 1, wherein the substrate comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, Cr: 0.15-0.75%, optionally Nb: 0.001-0.5%, optionally V: 0.001-0.5%, and a balance of Fe and unavoidable impurities.

4. The coated thermoformed component having excellent performances according to claim 1, wherein the composition of the substrate comprises at least one, any two, or all three of Cr, Nb, and V.

5. The coated thermoformed component having excellent performances according to claim 1, wherein Nb+V has a combined content of ≤0.40%.

6. The coated thermoformed component having excellent performances according to claim 1, wherein P has a content of 0.01-0.10%, and S has a content of 0.001-0.05%.

7. The coated thermoformed component having excellent performances according to claim 1, wherein Nb has a content of 0.001-0.40%, and V has a content of 0.001-0.40%.

8. The coated thermoformed component having excellent performances according to claim 1, wherein the thermoformed component has a yield strength of 400-1600 MPa, a tensile strength of 500-2300 MPa, and an elongation of ≥4%.

9. A method for manufacturing the coated thermoformed component having excellent performances according to claim 1, wherein the method comprises steps as follows:
   1) Al—Si plating: placing a strip steel in a plating bath for aluminum-silicon plating to obtain a plated steel sheet, wherein the plated steel sheet has a surface C, H or O content of ≤50 mg/m$^2$, a plating layer weight of 30-120 g/m$^2$ on one side, and a ratio of a standard deviation of the plating layer weight to an average plating layer weight satisfies: 0<standard deviation of plating layer weight/average plating layer weight≤0.3;

2) Blanking: processing the plated steel sheet, directly or after cold-rolling, into a blank in a shape required by a component by punching or laser cutting;

3) Heat treating the blank: placing the blank into a heating furnace for heating and soaking, wherein the heating furnace has a temperature of 680-970° C.; the atmosphere in the heating furnace is natural air with no additional gas supplied; a dew point in the furnace is lower than 5° C.; and a total residence time of the blank in the heating furnace is 1.5-13 minutes;

4) Blank transfer: transferring the heated blank into a mold quickly for stamping, wherein a transfer time is less than 10 seconds;

5) Hot stamping the blank: cooling and stamping the heated blank.

10. The method for manufacturing the coated thermoformed component having excellent performances according to claim 9, wherein in step 3), the heating furnace includes two temperature zones comprising a low temperature zone of 680-870° C. and a high temperature zone of 880-970° C., wherein a residence time of the blank in the low temperature zone is 0.5-3 minutes, and a residence time in the high temperature zone is 1-10 minutes.

11. The method for manufacturing the coated thermoformed component having excellent performances according to claim 9, wherein in step 5), the hot stamping of the blank starts at a temperature of not lower than 600° C.

12. The method for manufacturing the coated thermoformed component having excellent performances according to claim 9, wherein in the stamping process of step 5), quenching while holding pressure is continued for 4-20 s after the mold is clamped, wherein an average pressure applied to the component for pressure holding needs to be greater than 8 MPa on the surface of the component.

13. The method for manufacturing the coated thermoformed component having excellent performances according to claim 9, wherein in step 5), the heated blank is cooled between 800° C. and 400° C. at a cooling rate of greater than 30° C./s, preferably, greater than 60° C./s.

14. The method for manufacturing the coated thermoformed component having excellent performances according to claim 9, wherein after the stamping in step 5), the thermoformed component is removed from the mold after the mold has a surface temperature that is lower than 150° C.

15. The method for manufacturing the coated thermoformed component having excellent performances according to claim 9, wherein no oiling treatment is performed on the plated steel sheet subjected to the heat treatment, transfer and hot stamping of the blank.

16. The method for manufacturing the coated thermoformed component having excellent performances according to claim 11, wherein in step 5), the hot stamping of the blank starts at a temperature of 630-800° C.

17. The method for manufacturing the coated thermoformed component having excellent performances according to claim 13, wherein the heated blank is cooled between 800° C. and 400° C. at a cooling rate of greater than 60° C./s.

18. The method for manufacturing the coated thermoformed component having excellent performances according to claim 9, wherein the substrate of the coated thermoformed component comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, Nb: 0.001-0.5%, V: 0.001-0.5%, and a balance of Fe and unavoidable impurities; or the substrate of the coated thermoformed component comprises a composition by weight percentage of: C: 0.01-0.8%, Si: 0.05-1.0%, Mn: 0.1-5%, P: 0.001-0.3%, S: 0.001-0.1%, Al: 0.001-0.3%, Ti: 0.001-0.5%, B: 0.0005-0.1%, Cr: 0.15-0.75%, optionally Nb: 0.001-0.5%, optionally V: 0.001-0.5%, and a balance of Fe and unavoidable impurities.

19. The method for manufacturing the coated thermoformed component having excellent performances according to claim 18, wherein Nb+V has a combined content of ≤0.40%.

20. The method for manufacturing the coated thermoformed component having excellent performances according to claim 18, wherein the thermoformed component has a yield strength of 400-1600 MPa, a tensile strength of 500-2300 MPa, and an elongation of ≥4%.

* * * * *